United States Patent Office 3,555,109
Patented Jan. 12, 1971

3,555,109
IN SITU GENERATION OF UNIQUE PARTICULATE MATTER IN ORGANOPOLYSILOXANES
John Charles Getson, Onsted, Mich., assignor, by mesne assignments, to Stauffer-Wacker Silicone Corporation, a corporation of Delaware
Filed Sept. 8, 1967, Ser. No. 666,404
Int. Cl. C08f 35/02; C08g 47/10
U.S. Cl. 260—825
15 Claims

ABSTRACT OF THE DISCLOSURE

A grafted organopolysiloxane composition containing in situ generated elongated particulate matter and a method for preparing the same which comprises contacting an organopolysiloxane with an organic monomer in the presence of a free-radical initiator at a shear rate of from 5 to 1,000 sec.$^{-1}$.

Figure 1:
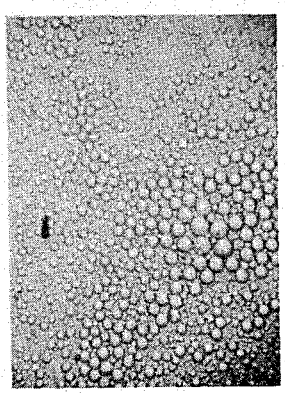

This invention is concerned with in situ generation of particles, particularly elongated rodlike particles in grafted organopolysiloxanes and more particularly to curable organopolysiloxanes which have improved physical properties and to a method for preparing the same.

Heretofore, organopolysiloxanes have found wide industrial applications because of their thermal stability, dielectric properties and resistance to atmospheric deterioration. It was found in some applications, that it was desirable to have improved physical properties, for example, improved tensile strength, elongation and tear strength values. In order to improve upon the physical properties of these organopolysiloxanes, various reinforcing agents and fillers have been incorporated therein. However, these fillers or reinforcing agents have not been able to improve to a desirable degree the tensile strength, tear strength and elongation values, particularly to a point where these values approach the physical properties of other synthetic and natural rubber. In addition, where the filled organopolysiloxanes are exposed for extended periods of time to elevated temperature, the physical properties depreciate markedly. In order to overcome these disadvantages, minor amounts of polytetrafluoroethylene fibers have been disposed in random fashion in the conventional organopolysiloxanes. However, it was found extremely difficult to retain these dispersed fibers as a homogeneous mixture. Consequently, the organopolysiloxane compositions exhibited improved physical properties in some cases, while in others they exhibited undesirable properties.

It is therefore an object of this invention to provide organopolysiloxanes containing unique particulate matter. Another object of this invention is to provide grafted organopolysiloxanes containing particulate matter. Still another object of this invention is to provide a method for generating elongated rodlike structures in grafted organopolysiloxanes. A further object of this invention is to provide in situ generation of particulate matter in grafted organopolysiloxanes. A still further object of this invention is to provide grafted organopolysiloxanes containing elongated rodlike particles which cure at room temperature. A still further object of this invention is to provide curable grafted organopolysiloxanes having improved physical properties.

The foregoing objects and others which will become apparent from the following description are accomplished in accordance with this invention, generally speaking, by providing grafted organopolysiloxanes having elongated rodlike particles therein. These grafted organopolysiloxanes may be prepared by contacting an organopolysiloxane with an organic monomer or low molecular weight polymer in the presence of a free-radical initiator under controlled reaction conditions, thereby causing in situ generation of elongated particulate matter therein.

Specifically, the present invention provides a method for preparing grafted organopolysiloxanes by controlling the temperature and stirring action in the grafting step to form particles, which are illustrated in the accompanying photographs.

In accordance with the method of this invention, olefinic monomers may be grafted to organopolysiloxanes in the presence of a free-radical initiator under controlled temperature and stirring conditions to form grafted organopolysiloxanes of the general formula

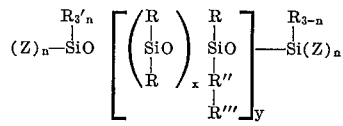

wherein R and R' are the same or different monovalent hydrocarbon radicals, halogenated monovalent hydrocarbon radicals or cyano-alkyl radicals; R" is a divalent hydrocarbon radical; R''' is a polymeric organic radical linked to R" by a carbon-to-carbon linkage; Z is a monovalent radical which may be the same as R or R' or a hydrolyzable or condensible group such as hydrogen, hydroxyl, amino, aminooxy, oximo, halogen, aryloxy, acyloxy or alkoxy groups; $n$ is an integer of from 1 to 3; $x$ is an integer of from 1 to 20,000 and $y$ is an integer of from 1 to 500.

The organopolysiloxanes used in the grafting step may be represented by the formula

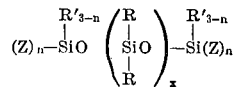

wherein R, R', Z, $n$ and $x$ are the same as those described above. In the above formula, R and R' which may be the same or different represent organic radicals such as alkyl radicals, e.g., methyl, ethyl, propyl, butyl, hexyl, octyl, decyl and octadecyl radicals; aryl radicals, e.g., phenyl, tolyl, xylyl and naphthyl radicals; aralkyl radicals, e.g., benzyl and phenylethyl radicals; cycloalkyl radicals, e.g., cyclohexyl and cycloheptyl radicals.

The grafted organopolysiloxanes consist of an organosilicon polymer "backbone" having attached thereto at least one or more side chains or branches consisting of a carbon-chain polymer. In the grafting step, hydrogen is abstracted from the organosilicon polymer "backbone" by a free-radical initiator to form an active site for connecting polymer.

Any organosilicon polymer may be used as the "backbone" polymer in this invention since these polymers are apparently capable of producing some free radicals or active sites under the proper conditions. Thus, the "backbone" polymer should be one which is capable of producing a substantial and recognizable number of free radicals and it should be substantially free of any tendency to undergo further polymerization under the conditions employed. Thus, the "backbone" polymer should be one which is substantially free of any aliphatic unsaturation; however, a low degree of any such unsaturation does not preclude the desired reaction, even though it may set up a competitive reaction which is usually preferably avoided. It is prefered that the organopolysiloxane have lower alkyl radicals attached to the silicon atoms since these are more amenable to hydrogen abstraction than other radicals. In addition, it is generally advisable to use organopolysiloxanes substantially free of silicon-bonded hydrogen.

Examples of suitable organopolysiloxane polymers and copolymers which may be used in the formation of grafted polymers are hydroxyl-terminated silxoane fluids (OH-fluids), methyl phenyl fluids, methyl vinyl fluids, and copolymers of dimethylsiloxane and phenyl-, methyl- or diphenyl-siloxane units.

In addition, the organopolysiloxane "backbone" may be in a form of partially hydrolyzed silanes containing residual hydrolyzable or condensible groups such as silanols, salts of silanols and partially condensed and completely condensed polysiloxanes. Examples of completely condensed polysiloxanes are hexamethyldisiloxanes, cyclic siloxanes such as octamethylcyclotetrasiloxane and trimethylsiloxy end-blocked polymers of dimethylsiloxanes.

Any polymerizable organic monomer having aliphatic olefinic bonds may be grafted to the organopolysiloxane "backbone." Examples of suitable olefinic compounds are low molecular weight straight-chain hydrocarbons such as ethylene, propylene, butylene; vinyl halides such as vinyl chloride and vinyl fluoride; vinyl esters of organic acids such as vinyl acetate; styrene, ring-substituted styrenes and other vinyl aromatics such as vinyl pyridine and vinylnaphthalene; acrylic acid and derivatives of acrylic acid including the salts, esters, amides and acrylonitrile; N-vinyl compounds such as N-vinylcarbazole, N-vinylpyrrolidone and N-vinylcaprolactam; and vinyl silicon compounds such as vinyltriethoxysilane.

Disubstituted ethylenes of the type $CH_2=CX_2$ may be used including vinylidene fluoride, vinylidene chloride, vinylidene cyanide, methacrylic acid and compounds derived therefrom such as the salts, esters and amides as well as methacrolein, methacrylonitrile and the like.

Examples of disubstituted ethylenes of the type $CHX=CHX$ such as vinylene carbonate and various monomers which polymerize best in the presence of other monomers, e.g., maleic anhydride, esters of maleic and fumaric acids, stilbene, indene and coumarone may be used in the formation of these graft polymers.

As before emphasized, the monomers may be used singly or in combinations of two or three or even more. The properties of the graft product, of course, depend on the nature and identity of the monomer material as well as on the amounts used relative to the organopolysiloxanes. Monomers that give elastomeric homopolymers generally provide elastomeric graft products while those that give plastic homopolymers tend to yield graft products which are less elastic. By using at least one monomer from each class, graft products can be obtained meeting requirements which the prior compositions cannot approach.

The grafting operation is most expeditiously effected by using a free-radical initiator, normally organic peroxides although other free-radical initiators such as azo-compounds in which both the N atoms of the azo linkage are attached to a tertiary carbon atom and the remaining valences of the tertiary carbon atom are satisfied by nitrile, carboxylalkyl, cycloalkylene or alkyl radicals, preferably having from 1 to 18 carbon atoms. In addition to the above mentioned initiators, ionizing radiation may also be used to bring about the formation of free radicals.

The most suitable peroxide initiators are compounds of the formula ROOH or compounds of the formula ROOR in which R is an organic radical. Specific examples of peroxides which are operative in this invention are hydroperoxides such as t-butyl hydroperoxide, cumene hydroperoxide, decaline hydroperoxide; dialkyl peroxides such as di-t-butyl and dicumyl peroxide; cyclic peroxides such as ascaridole and 1,5-dimethylhexane-1,5-peroxide and peresters such as t-butyl perbenzoate, t-butyl peroxyisopropylcarbonate and t-butyl peroctoate; ketone peroxides such as acetone peroxide and cyclohexanone peroxide are also applicable.

Acyl peroxides and peracids may be used in the practice of this invention, but in general they result in less grafting, i.e., poor yields of the grafted product. The difference is believed to lie in the nature of the radicals produced. Thus tertiary alkoxy radicals from di-t-butyl peroxide, for example, have a strong tendency to abstract hydrogen atoms which is a necessary step in grafting. On the other hand, acyloxy radicals produced from an acyl peroxide, e.g., benzoyl peroxide, while effective polymerization initiators are relatively ineffective hydrogen abstractors.

The amount of free-radical initiator employed is not critical, thus any amount capable of producing a perceptible degree of grafting is suitable. Generally, as little as 0.05 percent of the more active peroxide initiators based on the weight of the monomer is adequate in most cases. However, where it is desirable to increase the reaction rate, then as much as 3 percent or even more of the initiator may be used. As a general rule, it is advisable not to exceed about 5 percent concentration, since higher concentrations tend to promote cross-linking and thus cause an undesirable increase in the viscosity of the reaction mixture.

It is preferred that the reaction be conducted in the absence of an inert solvent, since a solvent retards the formation of particulate matter during the grafting of organopolysiloxanes.

Surprisingly, it has been found that temperature, shearing action, silicone concentration and viscosity effect the in situ generation of the elongated rodlike particles.

Although the temperature employed in the grafting of the organopolysiloxanes is not critical, it has been found that temperatures above about 160° C. will in some cases prevent the generation of rodlike structures, and thus provide a polymer having inferior properties. Consequently, it is preferred that grafting be conducted at temperatures below about 150° C., preferably at a temperature of from about 100° C. to about 140° C.

The proportion of organic monomers used in the grafting reaction may be varied within wide limits; however, the formation of elongated rodlike particles is influenced by silicone content. Thus, when the organopolysiloxane concentration is above about 50 percent by weight of the reactants, elongated rodlike particles are not formed. Likewise, when the silicone content is below about 20 percent, the grafted polymer is a semisolid. Even though the proportion of organopolysiloxane fluid may be below about 25 percent by weight based on the weight of the reactants, it is preferred that the organopolysiloxane concentration be from about 25 to 50 percent of the total weight of the reactants. It has been found that when the silicone content is between about 25 and 50 percent that rodlike particles are formed which contribute to improved physical properties of the cured polymers.

In addition, the viscosity of the organopolysiloxane fluid used in preparing these grafted organopolysiloxanes has a profound effect on the formation of the elongated rodlike particles and also on the physical properties of cured polymers. Even though the viscosity of the organopolysiloxane fluid used in the grafting operation may vary over a wide range, it is preferred that the viscosity of the fluid be from about 150 up to about 6,000 cs. at 25° C., preferably from about 250 to 2,000 cs.

In addition, it has been found that the in situ generation of elongated rodlike particles in the grafted organopolysiloxanes is greatly influenced by the stirring rate. It is believed that shear rate is an important factor and by controlling the amount of shear exerted on the reactants in the grafting step, particles are formed which take on different configurations. For example, elongated rodlike particles of from 10 to 500 microns in length and from 1 to 5 microns in diameter are generated in situ by carefully controlling the shear rate. Also, it has been found that rodlike particles greatly improve the physical properties of the grafted organopolysiloxane, particularly the cured polymer, while spherical particles have a much smaller effect, if any, upon the physical properties of these polymers. Consequently, it is preferred that elongated rodlike particles be generated in the grafted organopolysiloxanes in order to impart improved physical properties to the grafted polymer. For example, where grafted organopolysiloxanes containing rodlike structures are used in the formation of room-temperature-vulcanizing silicone polymers, the tensile strength, elongation and tear strength values are considerably improved over those which have been obtained heretofore in the art.

As mentioned previously, the shear rate appears to have a profound influence on the size and shape of these particles. It has been determined that for best results, the shear rate should be in the range of 5 to 1,000 sec.$^{-1}$, preferably from about 15 to 300 sec.$^{-1}$ and more preferably from about 25 to about 150 reciprocal seconds. The shear rate is calculated as the linear speed of the impeller divided by its distance from the wall of the reactor at the point of closest approach.

The products of this invention may be separated from the unreacted monomers by any conventional technique known in the art, such as by distillation, solvent extraction or selective solvent fractionation. It was found in some cases that rodlike particles formed at a monomer conversion of about 70 percent. In general, however, it is preferred that the reaction be carried to at least 80 percent conversion.

As mentioned previously, the grafted organopolysiloxanes may be used in room-temperature-vulcanizing elastomers. In a one-component system, the grafted polymer should have groups which are hydrolyzable by ambient moisture. For example, when hydroxyl-terminated grafted organopolysiloxanes are used in a one-component system, a silane of the general formula $X_{4-m}SiY_m$ wherein X is a relatively inert group such as alkyl, alkoxy or aryl, Y is an acyloxy, oximo, alkoxy, halogen or aminooxy and $m$ is an integer of from 3 to 4 is added as a cross-linking agent to the hydroxyl-terminated organopolysiloxane, whereby the hydroxyl groups are replaced by polyfunctional groups of the type $OSiX_{4-m}Y_{m-1}$. Examples of these silanes are methyltriacetoxysilane, isopropoxytriacetoxysilane, methyltriacetoximosilane, methyl-tris-diethylaminooxysilane and the like.

In the usual procedure, the cross-linking agent is added to the grafted organopolysiloxane immediately after its formation while the same is still hot or at least warm. Under these conditions, the terminal hydroxyl groups carried by the grafted organopolysiloxane are converted to functional groups which are hydrolyzable in ambient moisture. These compositions may be cured by merely exposing them to atmospheric moisture with or without any additional water vapor. Upon exposure to moisture, the composition is cured at times varying from a few minutes to several hours or days.

When these grafted organopolysiloxanes are used in a two-component system, the hydroxyl-terminated grafted organopolysiloxanes are mixed with a cross-linking agent such as a polyalkoxysilane of the formula $(R^aO)_zSiR^b_{4-z}$ or a polyalkoxysiloxane in which the silicon atoms are linked through Si-O-Si linkages and the remaining valences of the silicon atom are satisfied by $R^aO$ and $R^b$. In the above formula, the groups represented by $R^a$ are monovalent hydrocarbon radicals having less than 8 carbon atoms, while those represented by $R^b$ are monovalent hydrocarbon radicals or halogenated hydrocarbon radicals of less than 8 carbon atoms and z has a value of from 3 to 4. Examples of monovalent hydrocarbon radicals represented by $R^a$ are methyl, ethyl, propyl, butyl, hexyl, octyl, phenyl, vinyl, allyl, ethylallyl, butadienyl and the like. Radicals represented by $R^b$ may be the same as the radicals represented by $R^a$ above, as well as corresponding halogenated groups such as chloromethyl, 2-bromo-4,6-diiodophenyl, 1,2-difluorovinyl, 3,4 - difluorocyclopentyl, 2-bromocyclopentene-2,3-yl and 6-chlorohexyl. The polyalkoxysilanes employed herein include mono-organotrihydrocarbonoxysilanes, tetrahydrocarbonoxysilanes, alkyl silicates and partial hydrolyzates of such silanes. The polyalkoxy compounds, e.g., ethyl orthosilicate or partially hydrolyzed ethyl silicates such as ethyl silicate "40" which consist primarily of decaethyltetrasilicate are representative of these compounds. Examples of other operative alkyl silicates are ethyltrimethoxysilane, methylbutoxydiethoxysilane, propyltripropoxysilane, methyltriethoxysilane, ethyltriethoxysilane, ethyl orthosilicate and n-butyl orthosilicate. Examples of alkyl polysilicates are ethyl polysilicate, isopropyl polysilicate, butyl polysilicate, dimethyltetraethoxydisiloxane, trimethylpentabutoxytrisiloxane and the like.

The polyalkoxysilanes and polyalkoxysiloxanes employed herein may be used either alone or in combination. They should be used in a proportion of from about 0.5 to about 20 percent or more, preferably from about 1 to 10 percent by weight based on the weight of the organopolysiloxane. If the total weight of the polyalkoxysilanes or polyalkoxysiloxanes is below about 0.5 percent based on the weight of the organopolysiloxane, very little cross-linking occurs. If, on the other hand, the total weight of the polyalkoxysilanes or polyalkoxysiloxanes is above about 10 percent based on the weight of the organopolysiloxane, the curing time will not be substantially reduced. However, a large excess of cross-linking agent insures complete reaction with all silicone bonded hydroxyl groups and in addition, acts as a scavenger for any moisture which may be present.

These organopolysiloxane compositions are cured by mixing the hydroxyl-terminated grafted organopolysiloxanes with the polyalkoxysilanes or polyalkoxysiloxanes in the presence of metallic salts of organic carboxylic acid catalysts. Examples of suitable acid radicals are those which yield the acetate, the butyrate, the octoate, the linoleate, the stearate and the oleate. The metal ion of the metallic salt may consist of lead, tin, zirconium, antimony, iron, cadmium, barium, calcium, titanium, bismuth and manganese. Examples of suitable salts are tin naphthenate, lead octoate, tin octoate, iron stearate, tin oleate, antimony octoate, tin butyrate and the like. Other catalysts which may be used are bis(acetoxybutyl-phenyltin)oxide, bis(acetoxydibutyltin)oxide, bis(tributyltin)oxide, bis[tris(o-chlorobenzyl)tin]oxide, dibutoxydibutyltin, tris-t-butyltin hydroxide, triethyltin hydroxide, diamyldipropoxytin, dioctyltin dilaurate, diphenyloctyltin acetate, dodecyldiethyltin acetate, trioctyltin acetate, triphenyltin acetate, triphenyltin laurate, triphenyltin methacrylate, dibutyltin butoxychloride and the like. These catalysts may be dispersed in a solvent and then added to the hydroxyl-terminated grafted organopolysiloxane or they may be dispersed on a suitable filler or additive and thereafter milled with the grafted polymer. Examples of suitable hydrocarbon solvents are benzene, toluene, xylene and the like; halogenated hydrocarbons such as perchloroethylene or chlorobenzene; organic ethers such as diethyl ether, dibutyl ether and the like or fluid hydroxyl free polysiloxanes. It is preferred that the solvents be of sufficient volatility to vaporize off at room temperature.

These organopolysiloxanes may be compounded in the usual manner for preparing conventional siloxane elastomers. However, when the materials are stored prior to use, it is essential that either the catalyst or the cross-linking agent such as the polyalkoxysilane or polyalkoxysiloxane be stored separately. In other words, the hydroxy terminated grafted organopolysiloxanes, cross-linking agent and filler if desired may be compounded and the catalyst added just prior to use. In another method, the grafted organopolysiloxane, catalyst and filler if desired may be compounded and the cross-linking agent added just prior to use. Where an inert filler is used, it may be added either to the hydroxyl-terminated grafted organopolysiloxane or the cross-linking agent prior to the addition of the catalyst or immediately after the reactants have been combined. These compositions cure spontaneously at room temperature upon mixing the ingredients, i.e., the hydroxyl-terminated grafted organopolysiloxane, catalyst, cross-linking agent and filler, if desired.

The amount of catalyst used in these curing systems may range from about 0.05 to about 2 percent by weight, preferably from about 0.1 to about 1 percent by weight based on the weight of the composition. A mixture of two or more of the catalysts enumerated above may be used if desired. The amount of catalyst added to the base composition is determined by the requirements of the particular job, especially the pot-life or working time required. For example, in caulking the working time is more or less conveniently calculated as on the order of from one to two hours. Thus, in this instance, the catalyst is added in an amount which will not result in any substantial stiffening of the silicone composition until expiration of such period of time. Normally, the composition is tack-free within 2 to 4 hours following the caulking operation and substantially cured after about 24 hours and completely cured after about 7 days. These periods, of course, vary somewhat with changes in humidity and temperature conditions. Thus, a faster cure results under conditions of high temperature and low humidity.

Although it is not essential, fillers may be incorporated in these grafted organopolysiloxane compositions. Examples of suitable fillers are fumed silicas, high-surface-area precipitated silicas, silica aerogels as well as coarser silicas such as diatomaceous earth, crushed quartz and the like. Other fillers which may be used are metallic oxides such as titanium oxide, ferric oxide, zinc oxide and fibrous fillers such as asbestos, fibrous glass and the like. Additives such as pigments and antioxidants and ultraviolet absorbents and the like may be included in these compositions.

In the grafting of various silicone fluids, increased lubricity, increased thermal stability and stabilization toward hydrolysis may be achieved. These compositions are suitable as lubricants, hydraulic fluids, elastomeric and plastic sealants, gaskets, encapsulants, adhesives and protective coatings.

Various embodiments of this invention are further illustrated by the following examples in which all parts are by weight unless otherwise specified.

EXAMPLE 1

To a cylindrical reactor having an inside diameter of 23 mm. and equipped with a concentric rod of 10 mm. diameter were introduced 8.3 parts of styrene, 6.7 parts of butyl acrylate, 10 parts of hydroxyl-terminated polydimethylsiloxane and 0.075 part of di-t-butyl peroxide. The reactor was purged with nitrogen and the reactants heated to a temperature of between 121° and 123° C. for 6 hours. Agitation was achieved by rotation of the rod. A small amount of unreacted monomers was then removed at an elevated temperature by applying a vacuum of 1 mm. Hg or less. Microscopic examination of the reaction product revealed the presence of particulate matter in the organopolysiloxane.

The above example was repeated, the stirring rate being varied from 0 to 960 r.p.m. in several runs. A comparison of particle size and shear rate is shown in Table I.

TABLE I

| | Speed, r.p.m. | Shear rate, sec.$^{-1}$ | Particle configuration | | |
|---|---|---|---|---|---|
| | | | Shape | D, $\mu$ | L, $\mu$ |
| Example No.: | | | | | |
| 1(a) | 0 | 0.0 | Spheres | 2 | |
| 1(b) | 60 | 1.8 | ---do---- | 7 | |
| | | | Rods | 2 | 10 |
| 1(c) | 120 | 9.7 | Rods | 2 | 35 |
| 1(d) | 240 | 19.3 | ---do--- | 5 | 175 |
| 1(e) | 480 | 38.7 | ---do--- | 2 | 35 |
| 1(f) | 960 | 77.5 | ---do--- | 2 | 30 |

D = Diameter.
L = Length.

Figure 2:
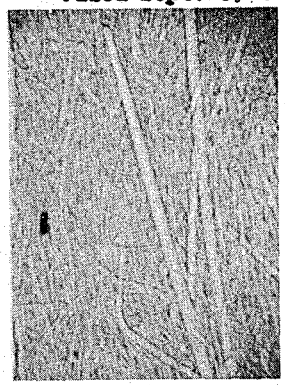

FIGS. 1 and 2 (×430) illustrate sections of a butyl acrylate-styrene grafted hydroxyl-terminated polydimethylsiloxane in a static system and in one having a shear rate of 19.3 sec.$^{-1}$ respectively.

EXAMPLE 2

In accordance with the procedure described in Example 1, a mixture consisting of 40 percent polydimethylsiloxane, 33 percent styrene, 27 percent butyl acrylate and 0.5 percent t-butyl peroxide was reacted in various types of commercial reactors with various agitator configurations at 125° C. After about 6 hours, the unreacted monomers were removed at an elevated temperature by applying a vacuum of about 1 mm. Hg or less. Examination of the reaction product under a microscope revealed the presence of rodlike particulate structures. Calculated shear rates are given in Table II.

TABLE II

| | Reactor capacity, gallons | Agitation, r.p.m. | Shear rate, sec.$^{-1}$ |
|---|---|---|---|
| Example No.: | | | |
| 2(a) | 1 | 100 | 102.0 |
| 2(b) | 1 | 150 | 260.0 |
| 2(c) | 1 | 350 | 430.0 |
| 2(d) | 50 | 90 | 47.1 |
| 2(e) | 50 | 100 | 52.3 |
| 2(f) | 100 | 120 | 18.8 |

EXAMPLE 3(a)

One hundred parts of a polymer with a composition as described in Example 1 and containing spherical particles having an average diameter of about 3 microns was mixed with 3 parts of ethyl silicate "40" and about 1 part of dibutyltin butoxychloride. The mixture was poured into a mold and cured for about 7 days at room temperature.

Figure 3:
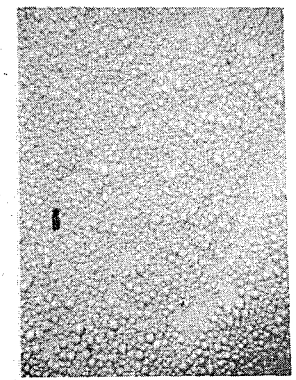

FIG. 3 is a photograph (×430) of the polymer containing spherical particles.

EXAMPLE 3(b)

One hundred parts of a polymer with a composition as described in Example 1 and containing rodlike particles having an average diameter of 2 microns and length of about 40 microns was mixed with 3 parts of ethyl silicate "40" and 1 part of dibutyltin butoxychloride, molded and cured for about 7 days at room temperature.

Figure 4:
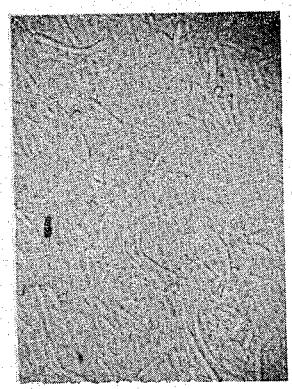

FIG. 4 is a photograph (×430) of the polymer containing rodlike particles. The physical properties of Examples 3(a) and (b) are compared in Table III. It is apparent that greatly improved properties result from the presence of rods.

TABLE III

| Example No.: | Particle configuration | | | Tensile strength, p.s.i. | Elongation, percent | Tear strength, lb./in. | Hardness Shore A |
| --- | --- | --- | --- | --- | --- | --- | --- |
| | Shape | D, μ | L, μ | | | | |
| 3(a) | Spheres | 3 | | 450 | 47 | 27 | 61 |
| 3(b) | Rods | 2 | 40 | 1,330 | 245 | 311 | 87 |

EXAMPLE 4

To a one-gallon reactor were introduced 936 parts of styrene, 768 parts of butyl acrylate, 85 parts di-t-butyl peroxide and 426 parts of hydroxyl-terminated polydimethylsiloxane. The reactor was purged with nitrogen and the reactants heated to a temperature of 130° C. for 4 hours while stirring at 150 r.p.m. The product was a solid at room temperature.

The above example was repeated except different proportions of hydroxyl-terminated polydimethylsiloxanes were used. The conversion of monomers was at least 90 percent in each case.

Figure 5:
Figure 6:
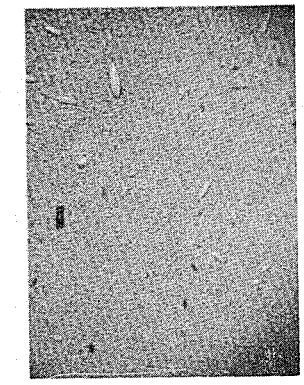

FIGS. 5 and 6 are photographs (×430) of the reaction products containing 25 percent and 60 percent by weight of silicone, respectively.

One hundred parts of each product prepared above was mixed with 3 parts of ethyl silicate "40" and 1 part of dibutyltin butoxychloride. Each mixture was poured into a mold and cured for about 7 days at room temperature. The physical properties are illustrated in Table IV.

TABLE IV

| OH-fluid, percent | Particle configuration | | | Tensile strength, p.s.i. | Elongation, percent | Tear strength, lb./in. | Hardness Shore A |
| --- | --- | --- | --- | --- | --- | --- | --- |
| | Shape | D, μ | L, μ | | | | |
| 20 | | | | | | | |
| 25 | Rods | 5 | 18 | 1,485 | 115 | 656 | 95 |
| 30 | do | 5 | 25 | 1,222 | 301 | 416 | 91 |
| 40 | do | 5 | 16 | 1,047 | 272 | 238 | 80 |
| 50 | do | 2 | 9 | 1,100 | 217 | 175 | 74 |
| 60 | Spheres | 2 | | 856 | 148 | 55 | 56 |

EXAMPLE 5

To a one-gallon reactor were introduced 936 parts of styrene, 768 parts of butyl acrylate, 1,704 parts of hydroxyl-terminated polydimethylsiloxane (viscosity 400 cs.) and 85 parts of di-t-butyl peroxide. The reactor was purged with nitrogen and the reactants heated at 130° C. for about 4 hours while stirring at about 150 r.p.m. The unreacted monomers were removed at 120° C. by applying a vacuum of 1 mm. Hg or less.

One hundred parts of the grafted product were mixed with about 3 parts of ethyl silicate "40" and about 1 part of dibutyltin butoxychloride. The mixture was poured into a mold and cured for about 7 days at room temperature. were substituted for the above hydroxyl-terminated organopolysiloxane. The results are illustrated in Table V.

TABLE V

| OH-fluid viscosity, cs. | Polymer viscosity, cs. | Particle configuration | | | Tensile strength, p.s.i. | Elongation, percent | Tear strength lb./in. | Hardness Shore A |
| --- | --- | --- | --- | --- | --- | --- | --- | --- |
| | | Shape | D, μ | L, μ | | | | |
| 400 | 3,944 | Rods | 3 | 16 | 1,100 | 217 | 175 | 74 |
| 2,000 | 18,800 | Spheres | 2 | | 1,000 | 243 | 78 | 68 |
| 6,700 | 136,400 | Spheres | 1 | | 625 | 243 | 83 | 56 |

The above example was repeated except that hydroxyl-terminated polydimethylsiloxanes of different viscosities

EXAMPLE 6

To a reactor were introduced various proportions of styrene and butyl acrylate in a ratio ranging from 10 to 100 mole percent of styrene and 40 percent of hydroxyl-terminated polydimethylsiloxane (400 cs.) based on the weight of the reactants and about 0.5 percent by weight of di-t-butyl peroxide based on the weight of monomers. The reactor was purged with nitrogen and the reactants heated at 130° C. for about 4 hours while stirring at about 150 r.p.m. The unreacted monomers were removed at an elevated temperature by applying a vacuum of about 1 mm. Hg or less.

One hundred parts of the grafted product were mixed with about 3 parts of ethyl silicate "40" and about 1 part of dibutyltin butoxychloride. The mixture was poured into a mold and cured for about 7 days at room temperature. The results of these experiments are illustrated in Table VI. It should be noted that the highest tear strengths are obtained only when rods are present.

TABLE VI

| Example No.: | Styrene, parts | Butyl acrylate, parts | Particle configuration | | | Tensile strength, p.s.i. | Elongation, percent | Tear strength lb./in. | Hardness, Shore A |
| --- | --- | --- | --- | --- | --- | --- | --- | --- | --- |
| | | | Shape | D, μ | L, μ | | | | |
| 6(a) | 60.0 | | Spheres | 4 | | 1,123 | 38 | 71 | 86 |
| 6(b) | 52.8 | 7.2 | do | 11 | | 1,202 | 42 | 67 | 84 |
| 6(c) | 45.9 | 14.1 | Rods | 4 | 23 | 1,340 | 33 | 87 | 86 |
| 6(d) | 39.3 | 20.7 | do | 5 | 46 | 1,690 | 53 | 113 | 88 |
| 6(e) | 32.9 | 27.1 | do | 4 | 41 | 1,330 | 245 | 311 | 87 |
| 6(f) | 26.9 | 33.1 | do | 4 | 34 | 979 | 303 | 87 | 76 |
| 6(g) | 21.1 | 38.9 | do | 4 | 34 | 689 | 265 | 43 | 43 |
| 6(h) | 15.5 | 44.5 | {Spheres / Rods} | 9 / 3 | / 25 | 185 | 196 | 19 | 21 |
| 6(i) | 10.1 | 49.9 | {Spheres / Rods} | 7 / 2 | / 9 | 180 | 155 | 19 | 22 |
| 6(j) | 5.0 | 55.0 | Spheres | 11 | | 105 | 149 | 16 | 19 |

EXAMPLE 7

One hundred parts of each of the polymers prepared in accordance with Example 6 was mixed with 3 parts of methyltriacetoxysilane and upon exposure to atmospheric moisture cured to solids varying in physical properties ranging from elastomers to plastics.

EXAMPLE 8

In accordance with the procedure described in Example 6, butyl methacrylate and styrene were grafted to a hydroxyl-terminated organopolysiloxane in which 30 percent by weight of organopolysiloxane based on the weight of the reactants is used. The results of these experiments are shown in Table VII.

TABLE VII

| Example No.: | Styrene, parts | Butyl methacrylate, parts | Particle configuration Shape | D, μ | L, μ | Tensile strength, p.s.i. | Elongation, percent | Tear strength, lb./in. | Hardness, Shore A |
|---|---|---|---|---|---|---|---|---|---|
| 8 (a) | 5.3 | 64.7 | Rods | 11 | 81.0 | 1,647 | 162 | 565 | 80 |
| 8 (b) | 10.8 | 59.2 | Spheres / Rods | 6 / 7 | 34.9 | 1,261 | 200 | 290 | 82 |
| 8 (c) | 16.7 | 53.3 | Spheres | 11 |  | 1,662 | 45 | 85 | 85 |
| 8 (d) | 22.9 | 47.1 | Spheres / Rods | 23 / 14 | 70.0 | 2,123 | 41 | 250 | 91 |
| 8 (e) | 29.6 | 40.4 | Spheres / Rods | 11 / 12 | 65.0 | 2,074 | 29 | 130 | 94 |
| 8 (f) | 36.6 | 33.4 | Spheres / Rods | 23 / 15 | 34.0 | 1,989 | 29 | 127 | 92 |
| 8 (g) | 44.1 | 25.9 | Spheres / Rods | 6 / 7 | 23.0 | 1,891 | 23 | 118 | 96 |
| 8 (h) | 52.2 | 17.8 | Spheres | 11 |  | 2,005 | 21 | 114 | 97 |
| 8 (i) | 60.8 | 9.2 | Spheres | 6 |  | 1,545 | 22 | 62 | 93 |

EXAMPLE 9

To a 500 ml. glass reactor were introduced 74.8 parts of diethyl fumarate, 45.2 parts of styrene, 80.0 parts of a hydroxyl-terminated polydimethylsiloxane having a viscosity of 400 cs. and 0.60 part of di-t-butyl peroxide. The reactor was purged with nitrogen and the reactants heated at 130° C. for 4 hours while being stirred at 200 r.p.m. The unreacted monomers were removed at 115° C. by applying a vacuum of about 3 mm. Hg or less over a period of about 2 hours. A product was recovered having a viscosity of 5,800 cs. and which contained rods having an average diameter of 7 microns and a length of 16 microns.

Although the present invention has been defined specifically with reference to the above noted examples, it should be understood that these examples were given only for purposes of illustration. Other variations will become apparent to those skilled in the art upon reading this disclosure. These variations are intended to be included within the scope of this invention.

The invention claimed is:

1. A composition comprising from 20 to 60 percent by weigh based on the composition of a linear organopolysiloxane having a viscosity up to about 6000 centistokes at 25° C. in which the organo groups are selected from the class consisting of monovalent hydrocarbon radicals, halogenated monovalent hydrocarbon radicals and cyanoalkyl radicals and having at least one polymeric organic side chain grafted to said organopolysiloxane and containing in situ generated elongated particulate matter ranging from about 5 to 500 microns in length, said polymeric side chain being constituted of recurring units derived from a monomer containing ethylenic unsaturation, said monomer being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides, and unsaturated nitriles, said in situ generated particulate matter resulting from the graft copolymerization of the organopolysiloxane and the monomer.

2. The composition of claim 1 wherein the organopolysiloxane is present in an amount of from about 25 to 50 percent by weight based on the weight of the composition.

3. The composition of claim 1 wherein the organopolysiloxane has terminal groups selected from the class consisting of monovalent hydrocarbon radicals, halogenated monovalent hydrocarbon radicals, cyanoalkyl radicals, hydroxyl groups and radicals hydrolyzable by ambient moisture.

4. The composition of claim 3 wherein the organopolysiloxane has terminal hydroxyl groups.

5. The composition of claim 1 wherein the polymeric chain is derived from at least two monomers.

6. The composition of claim 1 which is curable at room temperature, wherein the terminal groups are hydrolyzable by ambient moisture.

7. The composition of claim 6 in which the terminal groups are selected from the class consisting of acyloxy, oximo and aminooxy.

8. The composition of claim 4 which is curable at room temperature, which cotains a cross-linking agent and a catalyst.

9. The composition of claim 4 which is curable at room temperature and contains a catalyst and a cross-linking agent selected from the group consisting of polyalkoxysilanes and polyalkoxysiloxanes.

10. The composition of claim 1 wherein the grafted organopolysiloxane is represented by the formula:

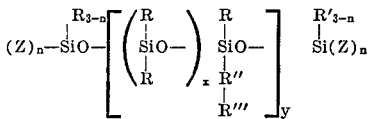

in which R and R' are selected from the group consisting of monovalent hydrocarbon radicals, halogenated monovalent hydrocarbon radicals, and cyanoalkyl radicals; R" is a divalent hydrocarbon radical; R''' is a polymeric group linked to R" by a carbon-to-carbon linkage, said polymeric group being constituted of recurring units derived from a monomer containing ethylenic unsaturation, said monomer being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides, and unsaturated nitriles Z is selected from the group consisting of monovalent hydrocarbon radicals, halogenated monovalent hydrocarbon radicals, cyanoalkyl radicals, radicals hydrolyzable by ambient moisture and hydroxyl groups; $n$ is an integer of from 1 to 3; $x$ is integer of from 1 to 20,000 and $y$ is an integer of from 1 to 500.

11. A method for in situ generating elongated particulate matter of from about 5 to 500 microns in length in an organopolysiloxane composition which comprises contacting an essentially solvent free composition containing from 20 to 60 percent by weight based on the composition of a substantially linear organopolysiloxane having a viscosity up to about 6000 centistokes at 25° C. in which the organo groups are selected from the class consisting of monovalent hydrocarbon radicals, halogenated monovalent hydrocarbon radicals and cyanoalkyl radicals with an organic monomer containing ethylenic unsaturation, said monomer being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides, and unsaturated nitriles, in the presence of a free-radical initiator at a temperature below about 160° C. at a shear rate of from about 5 to 1,000 sec.$^{-1}$, said in situ generated particulate matter resulting from the graft copolymerization of the organopolysiloxane and the monomer.

12. The method of claim 11 wherein the composition contains from about 25 to 50 percent by weight of organopolysiloxane based on the weight of the composition.

13. The method of claim 12 wherein the shear rate is from about 40 to 400 sec.$^{-1}$.

14. The method of claim 12 wherein the temperature is from about 100° to about 140° C.

15. The method of claim 12 wherein the resulting organopolysiloxane s represented by the formula:

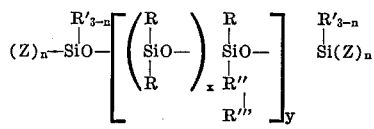

in which R and R' are selected from the group consisting of monovalent hydrocarbon radicals, halogenated nonvalent hydrocarbon radicals, and cyanoalkyl radicals; R" is a divalent hydrocarbon radical; R''' is a polymeric group linked to R" by a carbon-to-carbon linkage, said polymeric group being constituted of recurring units derived from a monomer containing ethylenic unsaturation, said monomer being selected from the class consisting of straight chain olefins whether or not attached to an aromatic nucleus, halogenated olefins again whether or not attached to an aromatic nucleus, unsaturated acids, esters of organic acids in which either the esterifying group or the derivative acid is unsaturated, unsaturated amides, and unsaturated nitriles, Z is selected from the group consisting of monovalent hydrocarbon radicals, halogenated monovalent hydrocarbon radicals, cyanoalkyl radicals, hydroxyl groups and radicals hydrolyzable by ambient moisture; $n$ is an integer of from 1 to 3; $x$ is an integer of from 1 to 20,000 and $y$ is an integer of from 1 to 500.

References Cited

UNITED STATES PATENTS

| | | | |
|---|---|---|---|
| 2,710,290 | 6/1955 | Safford et al. | 260—827 |
| 2,959,569 | 11/1960 | Warrick | 260—827 |
| 2,965,593 | 12/1960 | Dietz | 260—827 |
| 3,127,363 | 3/1964 | Nitzsche et al. | 260—827 |
| 3,189,576 | 6/1965 | Sweet | 260—46.5 |
| 3,035,016 | 5/1962 | Bruner | 260—46.5 |
| 3,318,898 | 5/1967 | Boissieras et al. | 260—46.5 |
| 3,436,252 | 4/1969 | Neuroth | 260—827 |

SAMUEL H. BLECH, Primary Examiner

U.S. Cl. X.R.

204—159.13; 260—23, 41, 46.5, 448.2, 827